(12) United States Patent
Matsubayashi et al.

(10) Patent No.: US 7,440,938 B2
(45) Date of Patent: Oct. 21, 2008

(54) METHOD AND APPARATUS FOR CALCULATING SIMILARITY AMONG DOCUMENTS

(75) Inventors: Tadataka Matsubayashi, Kawasaki (JP); Natsuko Sugaya, Inagi (JP); Michio Iijima, Yokohama (JP); Yuichi Ogawa, Yokohama (JP); Yuuki Watanabe, Yokohama (JP); Shinya Yamamoto, Kobe (JP); Tsuyoshi Sudou, Ichikawa (JP)

(73) Assignee: Hitachi, Ltd.

( * ) Notice: Subject to any disclaimer, the term of this patent is extended or adjusted under 35 U.S.C. 154(b) by 320 days.

(21) Appl. No.: 10/838,231

(22) Filed: May 5, 2004

(65) Prior Publication Data

US 2005/0021508 A1    Jan. 27, 2005

(30) Foreign Application Priority Data

Jul. 23, 2003    (JP) .............................. 2003-200193

(51) Int. Cl.
G06F 7/00    (2006.01)
(52) U.S. Cl. .............................................. 707/3; 707/5
(58) Field of Classification Search ................. 707/3–10
See application file for complete search history.

(56) References Cited

U.S. PATENT DOCUMENTS

| | | | |
|---|---|---|---|
| 5,544,049 A * | 8/1996 | Henderson et al. ............. 704/7 |
| 6,269,358 B1 * | 7/2001 | Hirata ............................ 707/1 |
| 6,671,683 B2 * | 12/2003 | Kanno ........................... 707/5 |
| 6,728,728 B2 * | 4/2004 | Spiegler et al. .......... 707/103 R |
| 6,990,628 B1 * | 1/2006 | Palmer et al. ................ 715/500 |
| 2003/0014398 A1 * | 1/2003 | Ohta et al. ..................... 707/3 |
| 2003/0140309 A1 * | 7/2003 | Saito et al. .................. 715/500 |
| 2004/0034633 A1 * | 2/2004 | Rickard ......................... 707/5 |
| 2004/0091843 A1 * | 5/2004 | Albro et al. ................. 434/127 |

FOREIGN PATENT DOCUMENTS

JP    2002-73681    3/2002

* cited by examiner

Primary Examiner—Wilson Lee
(74) Attorney, Agent, or Firm—Antonelli, Terry, Stout & Kraus, LLP.

(57) ABSTRACT

Information that individual elements (characteristic character strings) indicative of characteristics of a registered document appear in the registered document is stored in advance. When calculating similarity of the registered document, a query designated by a searcher is analyzed. The query is represented by a characteristic vector having the individual elements which take the relation between a plurality of words into consideration. Pieces of appearance information of the individual words contained in the query are counted. The counted appearance information is compared with a searching index to calculate similarity between documents.

6 Claims, 10 Drawing Sheets

METHOD AND APPARATUS FOR CALCULATING SIMILARITY AMONG DOCUMENTS

INCORPORATION BY REFERENCE

The present application claims priority from Japanese application JP2003-200193 filed on Jul. 23, 2003, the content of which is hereby incorporated by reference into this application.

BACKGROUND OF THE INVENTION

The present invention relates to a method for calculating similarity among documents and more particularly, to a method for searching, from a document database, a document containing contents similar to that described in a document designated by a searcher.

As a technique for searching or retrieving an intended document from a large number of electronic documents, a similar document searching technique has been known. JP-A-2002-73681 gives a description that in the similar document search technique, a document designated by a searcher (hereinafter referred to as a source document) and a document stored in a document database (hereinafter referred to as a registered document) are expressed by means of vectors each having vector elements represented by appearance information such as frequencies of appearance of words contained in the documents (hereinafter referred to as characteristic vectors) and a distance between the characteristic vectors is calculated as a similarity between the documents.

In the aforementioned conventional technique, however, the characteristic vector is so formed as to have one element represented by the appearance information of each word appearing in the documents and therefore, when one concept is expressed by a plurality of words, the similarity is calculated, with that concept being emphasized and there occurs a possible case in which the search or retrieval gives rise to a result unmeet for an intention of the searcher.

SUMMARY OF THE INVENTION

An object of the present invention is to provide a similarity calculation method capable of calculating similarity with high accuracies even when one concept is expressed by a plurality of words.

To accomplish the above object, according to the invention, when calculating similarity between a document registered in a document database and a query designated by a searcher, characteristic vectors whose vector elements describe the relation among a plurality of words are used.

Other objects, features and advantages of the invention will become apparent from the following description of the embodiments of the invention taken in conjunction with the accompanying drawings.

DETAILED DESCRIPTION OF THE EMBODIMENTS

Figure 1:
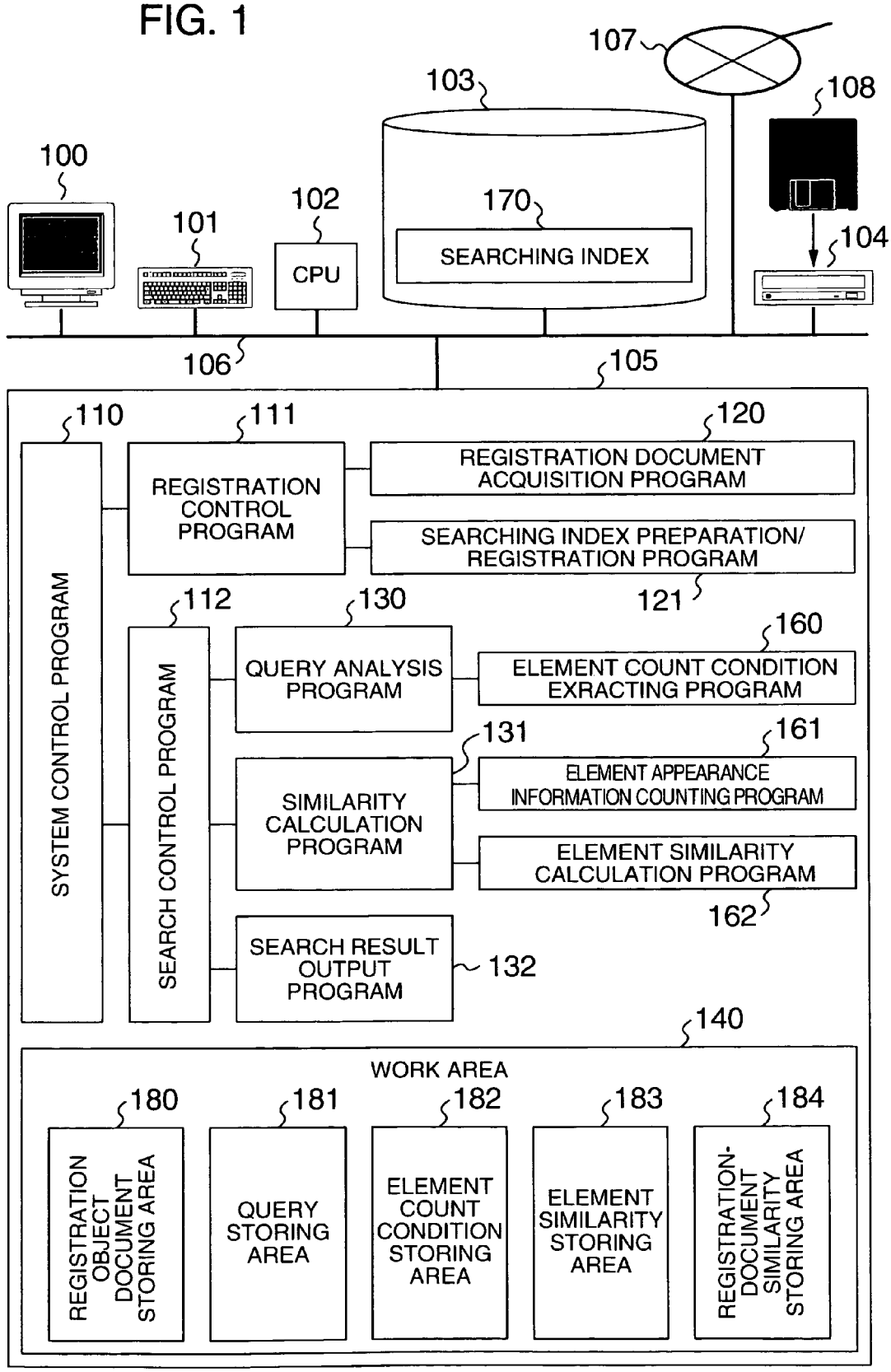
FIG. 1 is a block diagram showing the overall construction of a similar document search system according to a first embodiment of the invention.

Embodiments of the invention will now be described with reference to the accompanying drawings.

Firstly, a first embodiment of the invention will be described by making reference to FIG. 1. A similar document search system to which the present invention is applied comprises a display 100, a keyboard 101, a central processing unit (CPU) 102, a magnetic disk unit 103, a flexible disk drive (FDD) 104, a main memory 105, a bus 106 for mutually coupling these components and a network 107 for connecting the present system to another apparatus. The magnetic disk unit 103 is one of secondary storages and adapted to store a searching index 170. Information stored in a flexible disk 108 is read to the main memory 105 or magnetic disk unit 103 through the medium of the FDD 104.

Stored in the main memory 105 are a system control program 110, a registration control program 111, a search control program 112, a registration document acquisition program 120, a searching index preparation/registration program 121, a query analysis program 130, a similarity calculation program 131, and a search result output program 132. A work area 140 is secured on the main memory 105.

The query analysis program 130 is constructed of an element count condition extracting program 160. The similarity calculation program 131 is constructed of an element appearance information counting program 161 and an element similarity calculating program 162. Secured in the work area 140 are a registration object document storing area 180, a query storing area 181, an element count condition storing area 182, an element similarity storing area 183 and a registration-document similarity storing area 184.

The registration control program 111 and search control program 112 are started by the system control program 110 in accordance with a command inputted by a user from the keyboard 101 so that the program 111 may control the registration document acquisition program 120 and searching index preparation/registration program 121 and the program 112 may control the query analysis program 130, similarity calculation program 131 and search result output program 132.

While in the present embodiment the registration control program 111 and search control program 112 have been described as being started by the command inputted from the keyboard 101, they may be started by a command or event inputted by way of another input unit. In an alternative, the CPU may perform a process for starting the respective programs on the basis of a command inputted from the keyboard 101.

Alternatively, these programs may be stored in the magnetic disk unit 103, flexible disk 108 or a memory medium (not shown in FIG. 1) such as MO, CD-ROM or DVD, read to the main memory 105 through a drive unit and executed by the CPU 102. Further, these programs may otherwise be read to the main memory 105 through the medium of the network 107 and executed by the CPU 102.

Further, while in the present embodiment the searching index 170 has been described as being stored in the magnetic disk unit 103, it may be stored in the main memory 105 or may be stored in the flexible disk 108 or a memory medium (not shown in FIG. 1) such as MO, CD-ROM or DVD so as to be utilized by being read to the main memory 105 through a drive unit. Alternatively, this index may be stored in a memory medium (not shown in FIG. 1) connected to another system through the network 107 or may be stored in a memory medium directly connected to the network 107.

Further, the work area 140 has been described as being secured on the main memory 105 but it may be secured in the magnetic disk unit 103 or alternatively, it may be secured in the flexible disk 108 or a writable memory medium (not shown in FIG. 1) such as MO, CD-ROM or DVD or in a writable memory medium directly connected to the network 107.

Processing procedures in the similar document search system according to the present embodiment will be described hereunder.

Figure 2:
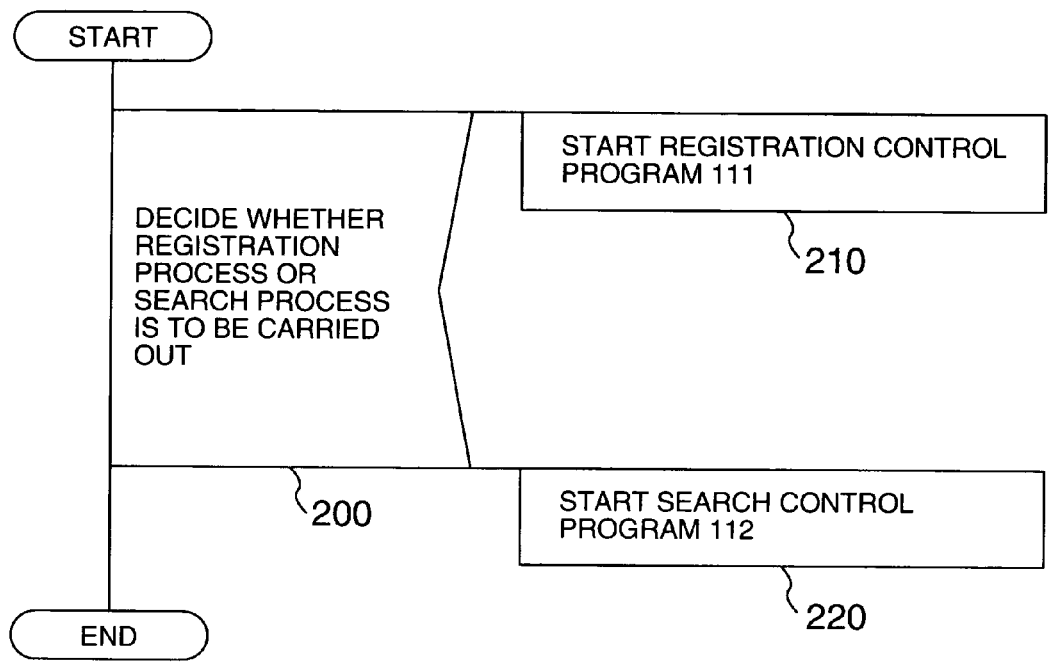
FIG. 2 is a PAD useful to explain a process procedure of a system control program 110 in the first embodiment of the invention.

Firstly, a process procedure of the system control program 110 will be described using a PAD of FIG. 2.

The system control program 110 analyzes a command inputted from the keyboard 101 (step 200). If a result of this analysis shows that the command is for registration execution, the program 110 starts the registration control program 111 to register a document (step 210) but if the analysis result shows that the command is for search execution, the program 110 starts the search control program 112 to search a similar document (step 220).

Next, a registration process procedure of the registration control program 111 shown in the step 210 of FIG. 2 will be described using a PAD of FIG. 3.

The registration control program 111 first starts the registration document acquisition program 120 to read a document designated as a registration object (hereinafter referred to as a registration object document) and stores it in the registration object document storing area 180 of work area 140 (step 301). Subsequently, the program 111 starts the searching index preparation/registration program 121 to prepare a searching index for the registration object document stored in the registration object document storing area 180 of work area 140 and store it, as searching index 170, in the magnetic disk unit 103 (step 302).

Next, a search process procedure of the search control program 112 shown in the step 220 of FIG. 2 will be described using a PAD of FIG. 4.

The search control program 112 first starts the query analysis program 130 to analyze a query inputted by a searcher (step 401). Subsequently, the program 112 starts the similarity calculation program 131 to calculate similarity of each registered document to the query (step 402). Individual registered documents are stored in the registration object document storing area 180. Then, the program 112 starts the search result output program 132 to deliver, as search results, similarity calculation results calculated in the step 402 (step 403). The search results may be delivered so as to be displayed on the display 100 or may be delivered so as to be stored in the work area 140 or on the magnetic disk unit 103. In case the similarity calculation results are delivered to the display 100, they may be delivered in ascending order of similarity or descending order of similarity or alternatively, they may be delivered in ascending order of management numbers assigned to the documents or descending order thereof.

Next, a process procedure of the query analysis program 130 shown in the step 401 of FIG. 4 will be described.

The query analysis program 130 reads a query inputted from the keyboard 101 and stores it in the query storing area 181 of work area 140. Then, the program 130 starts the element count condition extracting program 160 to extract element count conditions from the query stored in the query storing area 181 of work area 140 and store them in the element count condition storing area 182 of work area 140.

Next, a process procedure of the similarity calculation program 131 as shown in the step 402 of FIG. 4 will be described using a PAD of FIG. 5.

The similarity calculation program 131 reads the element count conditions stored in the element count condition storing area 182 of work area 140 by the query analysis program 130 and applies repetitive execution of steps 502 and 503 to the individual count conditions (step 501). The steps 502 and 503 to be carried out during the repetitive process will be described hereunder.

Firstly, the program 131 starts the element appearance information counting program 161 so that pieces of appearance information of an element may be counted by consulting the searching index 170 on the basis of a corresponding element count condition read in the step 501 (step 502). Thereafter, the program 131 starts the element similarity calculation program 162 to calculate similarity at that element on the basis of the appearance information counted in the step 502 (hereinafter referred to as element similarity) and stores it in the element similarity storing area 183 of work area 140 (step 503).

Similarity of each registered document is calculated from the element similarity stored in the element similarity storing area 183 of work area 140 in the step 503 and the calculated similarity is stored in the registation-document similarity storing area 184 of work area 140 (step 504).

For calculation of the element similarity in the step 502, a TF·IDF (Text Frequency, Inverted Documents Frequency) method, for instance, may be used.

Figure 6:
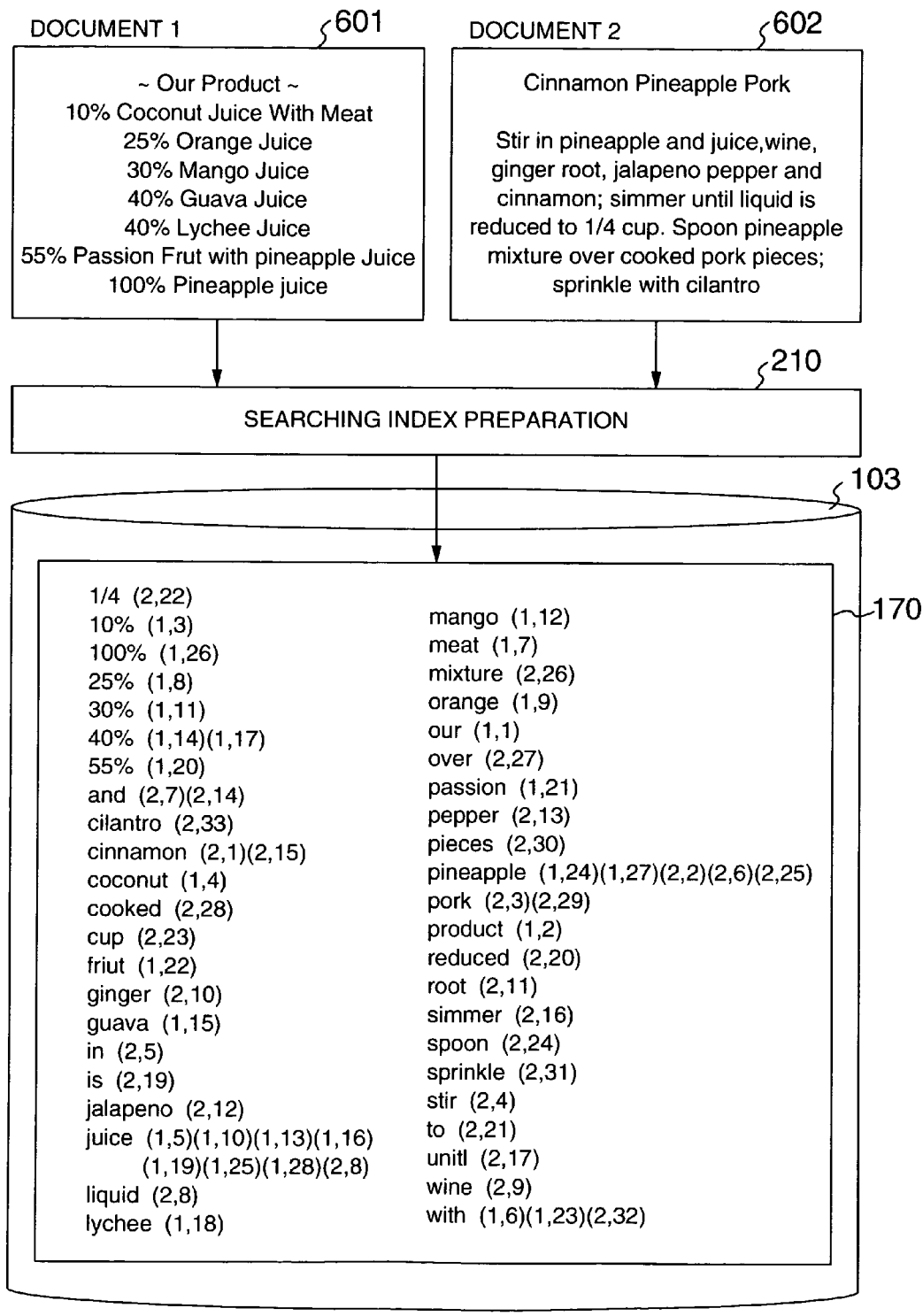
FIG. 6 is a diagram for explaining a registration process procedure in the first embodiment of the invention.
Figure 7:
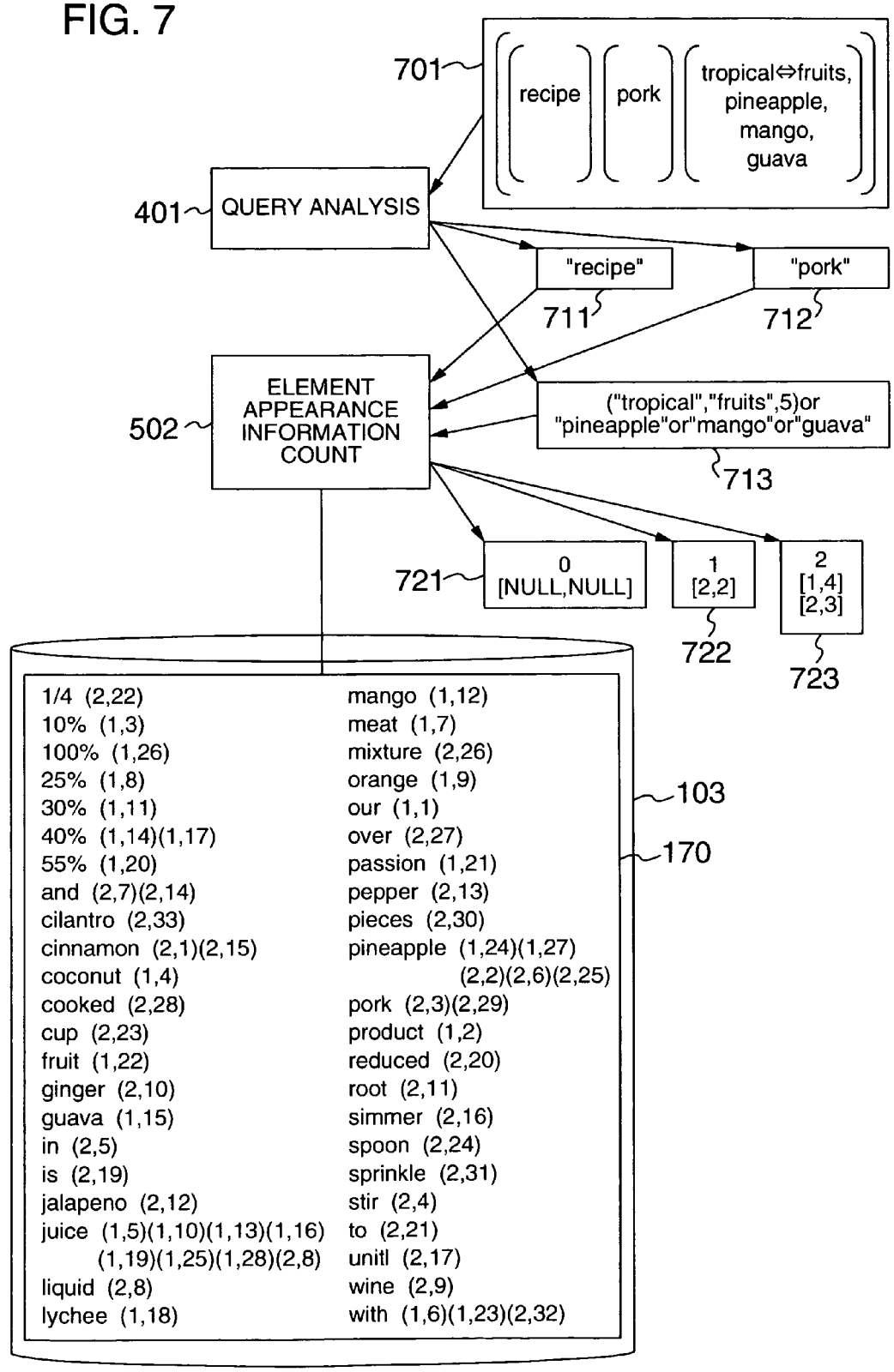
FIG. 7 is a diagram for explaining an element appearance information counting process procedure in the first embodiment of the invention.

Referring now to FIGS. 6 and 7, concrete processing procedures in the similar document search system according to the first embodiment of the invention will be described.

Firstly, reference is made to FIG. 6 to specifically describe the document registration process (FIG. 3) in the similar document search system shown in the first embodiment of the invention.

FIG. 6 shows the flow of process when a document 1[~Our Product ~10% Coconut Juice With Meat 25% Orange Juice 30% Mango Juice 40% Guava Juice 40% Lychee Juice 55% Passion Fruit with pineapple juice 100% Pineapple Juice] and a document 2[Cinnamon Pineapple Pork Stir in pineapple and juice, wine, ginger root, jalapeno pepper and cinnamon; simmer until liquid is reduced to ¼ cup. Spoon pineapple mixture over cooked pork pieces; sprinkle with cilantro] are registered in the document database.

Figure 3:
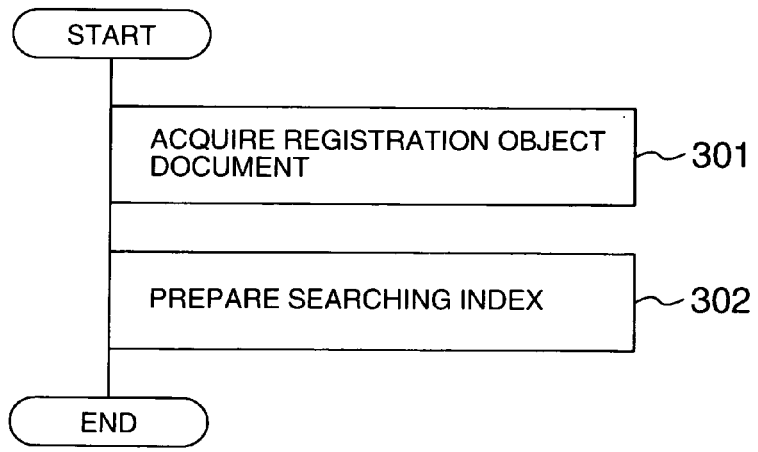
FIG. 3 is a PAD useful to explain a process procedure of a registration control program 111 in the first embodiment of the invention.

Firstly, the step 301 shown in FIG. 3 is executed, so that the documents 1 and 2 are read to the work area 140 by means of the registration document acquisition program 120 and they are stored as documents 601 and 602, respectively.

Next, the searching index preparation process 302 shown in FIG. 3 is executed for the documents 601 and 602 on the work area 140 so that a searching index 170 which stores appearance positions of individual words (or individual character strings) extracted by using a space as delimiter may be prepared in the magnetic disk unit 103.

The searching index 170 shown in this figure depicts an exemplified case where the heading, appearance document number and appearance position of each word are stored. In the figure, ["¼ (2, 22)"] signifies that a word termed "¼" appears as a $22^{nd}$ word in the document 2.

Next, a procedure of element appearance information counting process (step 502 in FIG. 5) applied to a query in the similar document search system according to the first embodiment of the invention will be described with reference to FIG. 7.

In the element appearance information counting process, a query 701 inputted by a searcher is first stored in the query storing area 181 of work area 140.

The query 701 is represented by a characteristic vector consisting of three elements in the example of FIG. 7, the three elements being comprised of axial vectors of (recipe), (pork) and (tropical⇔fruits, pineapple, mango, guava), respectively. Here, the "tropical⇔fruits" signifies a neighborhood condition of words "tropical" and "fruits".

It should be understood that when there are in one element a plurality of keywords punctuated by commas, that element is indicated by OR of the individual keywords. In the example as shown in FIG. 7, this corresponds to the third element (tropical⇔fruits, pineapple, mango, guava) and this element is indicated by OR of the four keywords of "tropical⇔fruits", "pineapple", "mango" and "guava".

Figure 4:
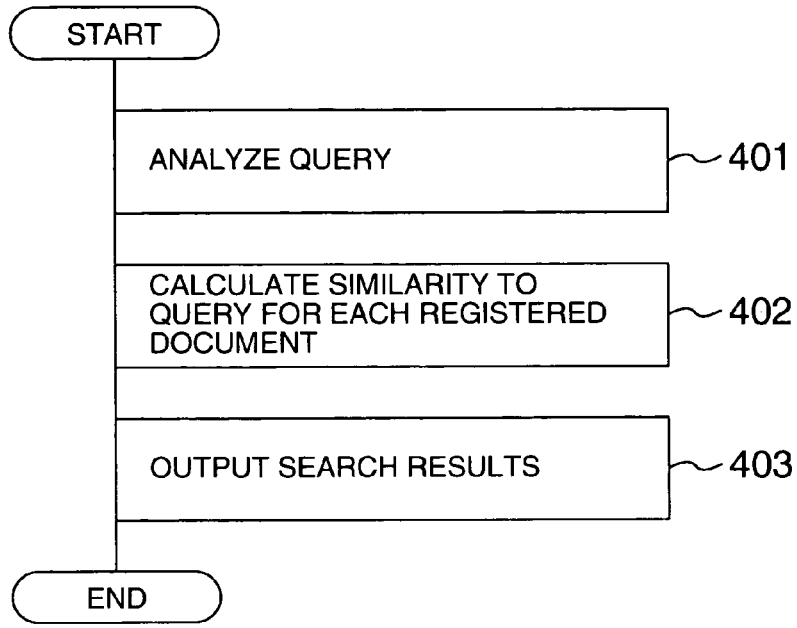
FIG. 4 is a PAD useful to explain a process procedure of a search control program 112 in the first embodiment of the invention.

Thereafter, the query analysis step 401 as shown in FIG. 4 is executed to analyze the query 701 read to the work area 140, so that parentheses, commas and symbol "⇔" indicative of the neighborhood condition inside the query 701 are discriminated to extract element count conditions 711 ["recipe"], 712 ["pork"] and 713 [("tropical, "fruits", 5) or "pineapple" or "mango" or "guava"]. For example, the element count condition 711 ["recipe"] indicates that a document containing the keyword "recipe" stands an object of element count condition and the element count condition 713 [("tropical", "fruits", 5) or "pineapple" or "mango" or "guava"] indicates that a document containing either "tropical" and "fruits" appearing in the range of 5 words or "pineapple", "mango" or "guava" stands an object of element count condition.

Figure 5:
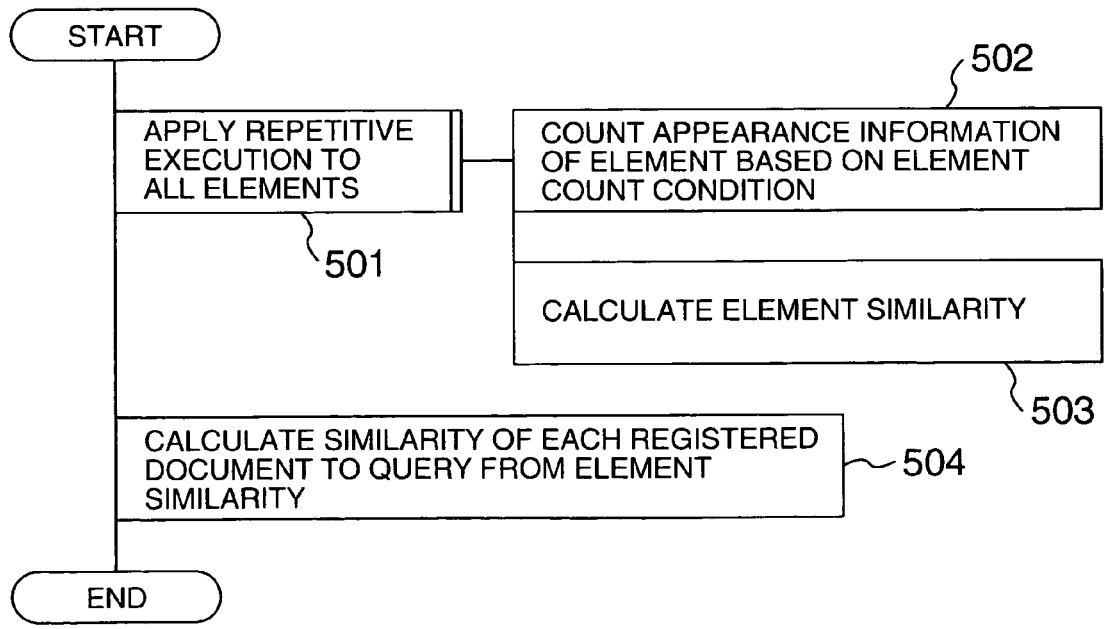
FIG. 5 is a PAD useful to explain a process procedure of a similarity calculation program 131 in the first embodiment of the invention.

Subsequently, the element appearance information counting step 502 shown in FIG. 5 is executed so that appearance information meeting the individual element count conditions 711, 712 and 713 extracted in the query analysis step 401 may be acquired by consulting the searching index 170.

In the example shown in this figure, 0[NULL,NULL] is acquired as appearance information of element count condition 711 ["recipe"], 1[2,2] is acquired as appearance information of element count condition 712 ["pork"], and 2[1,4] [2,3] is acquired as appearance information of element count condition 713 [("tropical","fruits",5) or "pineapple" or "mango" or "guava"]. Here, a number preceding the bracket indicates the number of documents in which the appearance information is present and numbers in each bracket indicate an appearance document number and the number or frequency of appearances, respectively. For example, the 1[2,2] representing the appearance information of element count condition 712 ["pork"] indicates [the number of documents [document number, appearance frequency]] and in this case, it is demonstrated that the number of documents meeting the count condition is 1 and there are two appearances in the document 2.

When analyzing the query 701 in the step 401, the parenthesis, comma and symbol [⇔] indicative of the neighborhood condition are identified but alternatively, other character strings such as space and period may be identified.

As described above, according to the first embodiment of the invention, a concept expressed by a plurality of keywords can be expressed as one element of a characteristic vector. Consequently, similarity calculation taking a complicated concept into consideration can be assured to thereby realize a highly accurate concept search.

While in the present embodiment the element count condition is expressed using the neighborhood condition and OR, other expression terms such as AND and NOT may be employed.

The present embodiment has been described by way of an example of the system for searching similar documents in English but English is not limitative and other languages may be used. In other words, in the document registration process according to the first embodiment of the invention, the words are extracted by using space as the delimiter but for a language such as Japanese language in which punctuation is unclear, either words extracted by consulting a word dictionary may be used or N-gram may be extracted.

While in the present embodiment the word index is used as searching index 170, the index method is not limitative and an N-gram index method may be employed. Further, in the present embodiment, the searching index 170 has a format for retrieving words appearing in individual documents but signature files of individual documents may be stored.

The present embodiment has been described by way of example of the similar document search system but the similarity calculation method in the present invention can be applied to not only the similar document search system but also calculation of similarity among documents. For example, the similarity calculation method shown in the present invention may be applied to similarity calculation in a similar site extract system for extracting sites meeting a query from documents, a document sort system for sorting sets of documents such as retrieval results on the basis of similarity of contents or a sorting target decision system for deciding sorting targets in accordance with categories prepared in advance.

Figure 8:
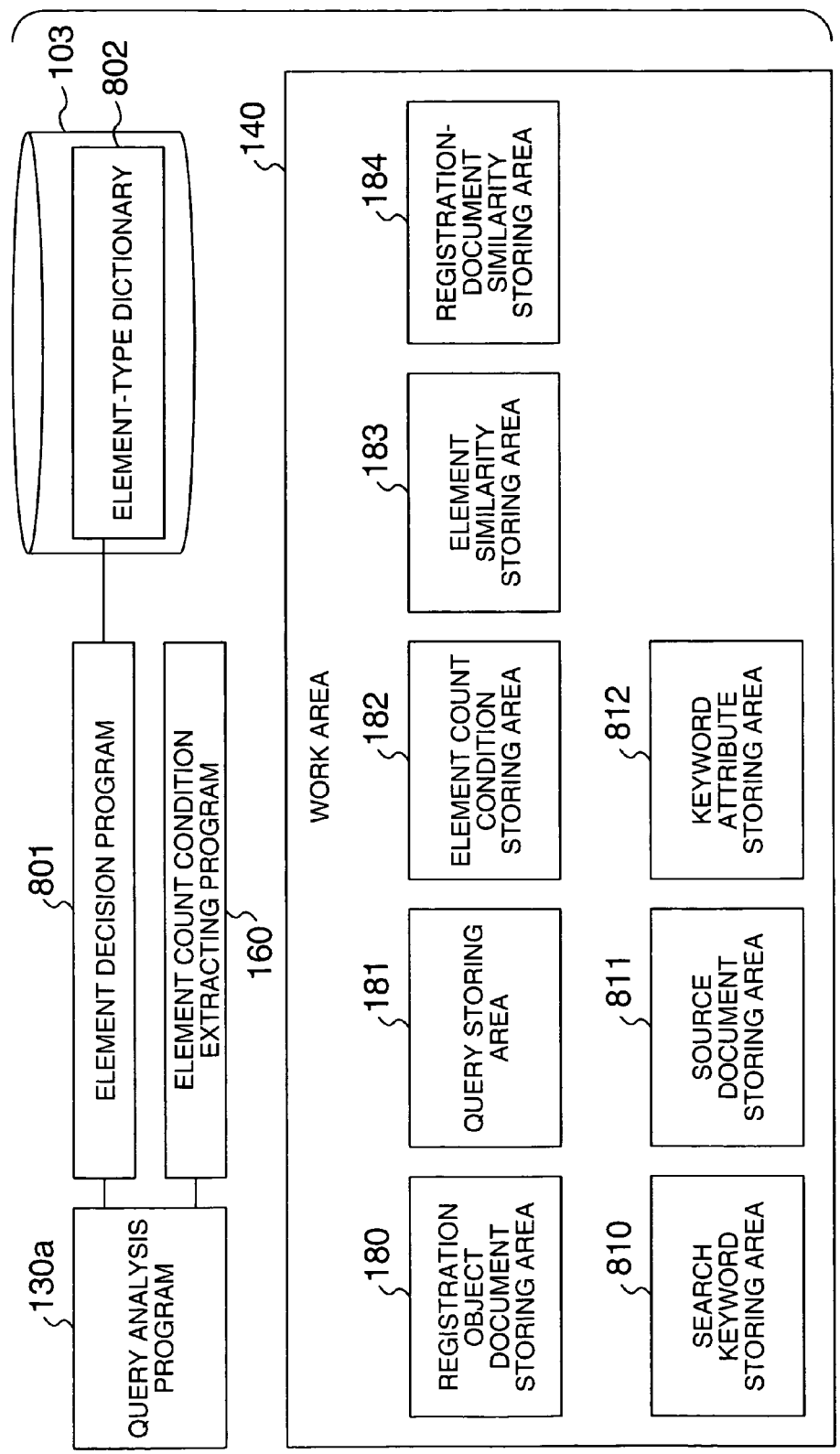
FIG. 8 is a block diagram showing the construction of query analysis program 130a and of work area 140 according to a second embodiment of the similar document search system to which the invention is applied.

Turning now to FIG. 8, a second embodiment of the invention will be described.

The present embodiment intends to automatically create element count conditions from a source document inputted by a searcher. Namely, a highly accurate search can be executed without preparing a complicated characteristic vector and load imposed on the searcher can be alleviated.

In the present embodiment, the system construction is substantially identical to that of the first embodiment (FIG. 1) but differs in that the main memory 105 of FIG. 1 has a query analysis program 130*a* which stores, in addition to the element count condition extracting program 160, an element decision program 801 and besides, the magnetic disk unit 103 has, in addition to the searching index 170, an element-type dictionary 802. Further, the work area 140 secures, in addition to the registration object document storing area 180, query storing area 181, element count condition storing area 182, element similarity storing area 183 and registered-document similarity storing area 184, a search keyword storing area 810, a source document storing area 811 and a keyword attribute storing area 812. Components other than the above are constructed similarly to FIG. 1.

Figure 9:
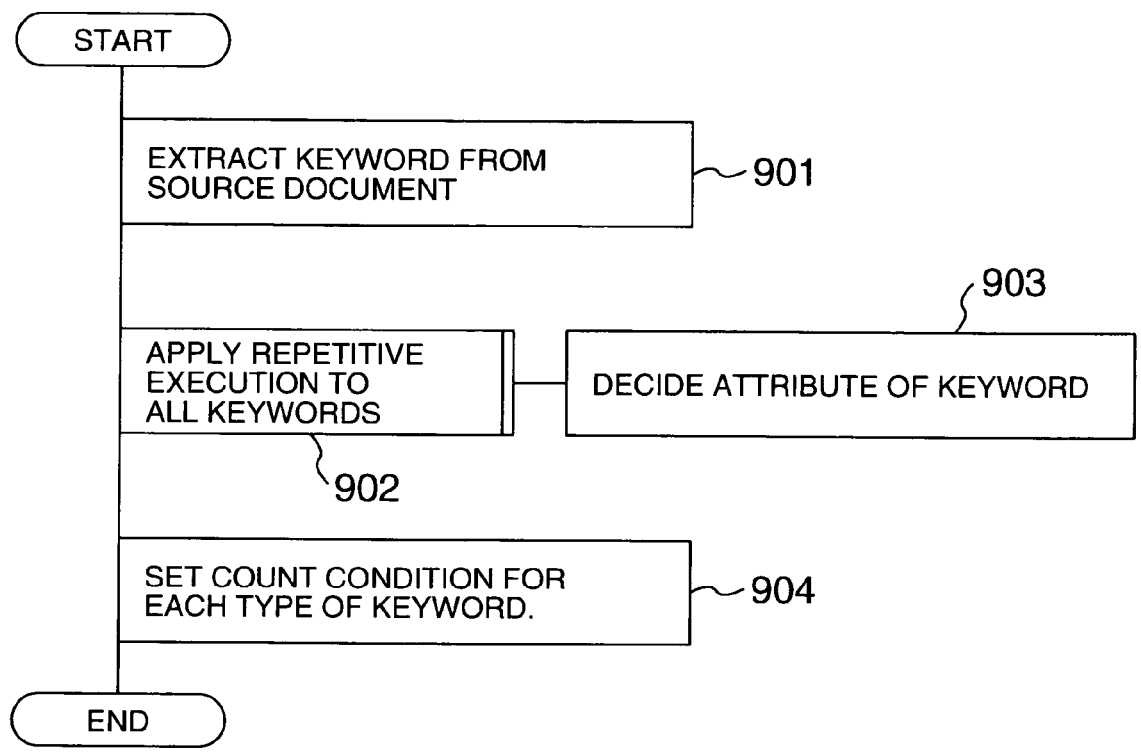
FIG. 9 is a PAD useful to explain a process procedure of an element-type decision program 801 in the second embodiment of the invention.

Of processing procedures in the present embodiment, a process procedure of element-type decision program 801 in the query analysis program 130a different from that in the first embodiment will be described using a PAD as shown in FIG. 9.

The element-type decision program 801 first analyzes a source document inputted through the keyboard 101 and extracts keywords to store them in the search keyword storing area 810 of work area 140 (step 901).

Subsequently, the ensuing step 903 is repetitively executed for all of the keywords stored in the search keyword storing area 810 of work area 140 (step 902). Namely, for a keyword selected in the step 902, a type of the keyword is decided by consulting the element-type dictionary 802 (step 903) and a count condition is set according to the type of keyword (step 904).

Processing procedures in the similar document search system according to the second embodiment of the invention shown in FIG. 8 will be described more specifically with reference to FIG. 10.

Figure 10:
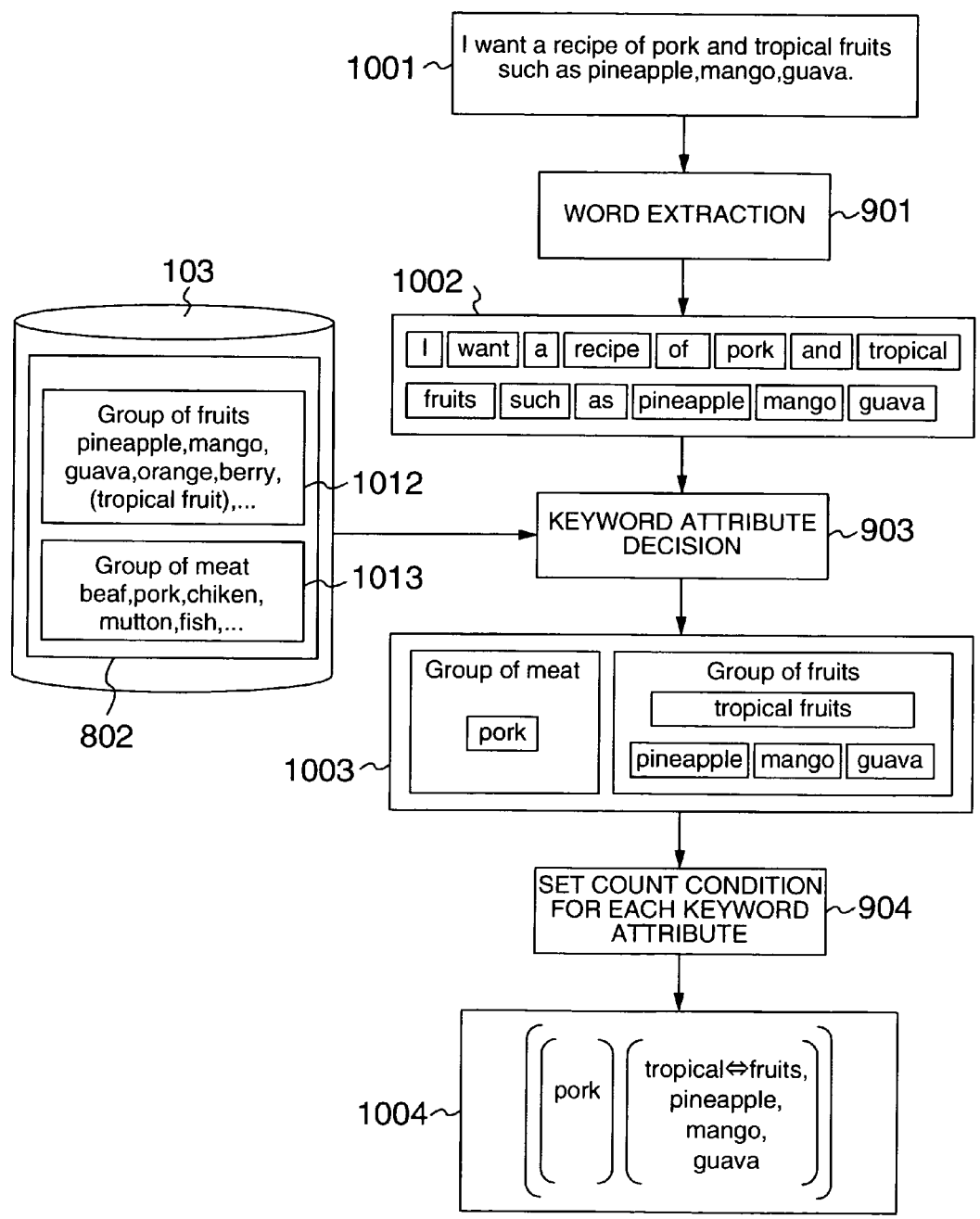
FIG. 10 is a flowchart for explaining a process procedure of the element-type program 801 in the second embodiment of the invention.

FIG. 10 shows the flow of a process of the element-type decision program 801 when a source document 1001 inputted by a searcher is read to the source document storing area 811 of work memory 140.

Firstly, for the source document 1001 stored in the source document storing area 811 of work area 140 and reading "I want a recipe of pork and tropical fruits such as pineapple, mango, guava.", the keyword extraction step 901 of FIG. 9 is executed and a group 1002 of extracted words is stored in the search keyword storing area 810 of work area 140.

Next, individual words in the word group 1002 extracted as above are subjected to execution of the keyword attribute decision step 903 shown in FIG. 9. In the keyword attribute decision step 903, the element-type dictionary 802 is consulted using a designated word as key to decide an attribute of each word. In an example shown in this figure, a [Group of fruits] 1012 and a [Group of meat] 1013 are defined as the-element-type dictionary 802 for words. Accordingly, the "tropical fruits", "pineapple", "mango" and "guava" appearing in the word group 1002 stored in the search keyword storing area 810 of work area 140 are so decided as to fall under the [Group of fruits] 1012 and the "pork" appearing in the word group 1002 is so decided as to fall under the [Group of meat] 1013, so that these words are classified according to different attributes to provide a keyword attribute 1003 of the individual words and the individual words are stored in the keyword attribute storing area 812 of work area 140 according to their attributes.

Next, the keyword attribute 1003 is subjected to execution of count condition setting step 904 of FIG. 9, so that the [Group of meat] consisting of one keyword is set as a sole count condition and the [Group of fruits] consisting of a plurality of keywords is set as OR conditions of the respective keywords, with the "tropical fruits" consisting of plural words being set as a neighborhood condition. Based on this result, a characteristic vector 1004 is created from the source document 1001.

Figure 11:
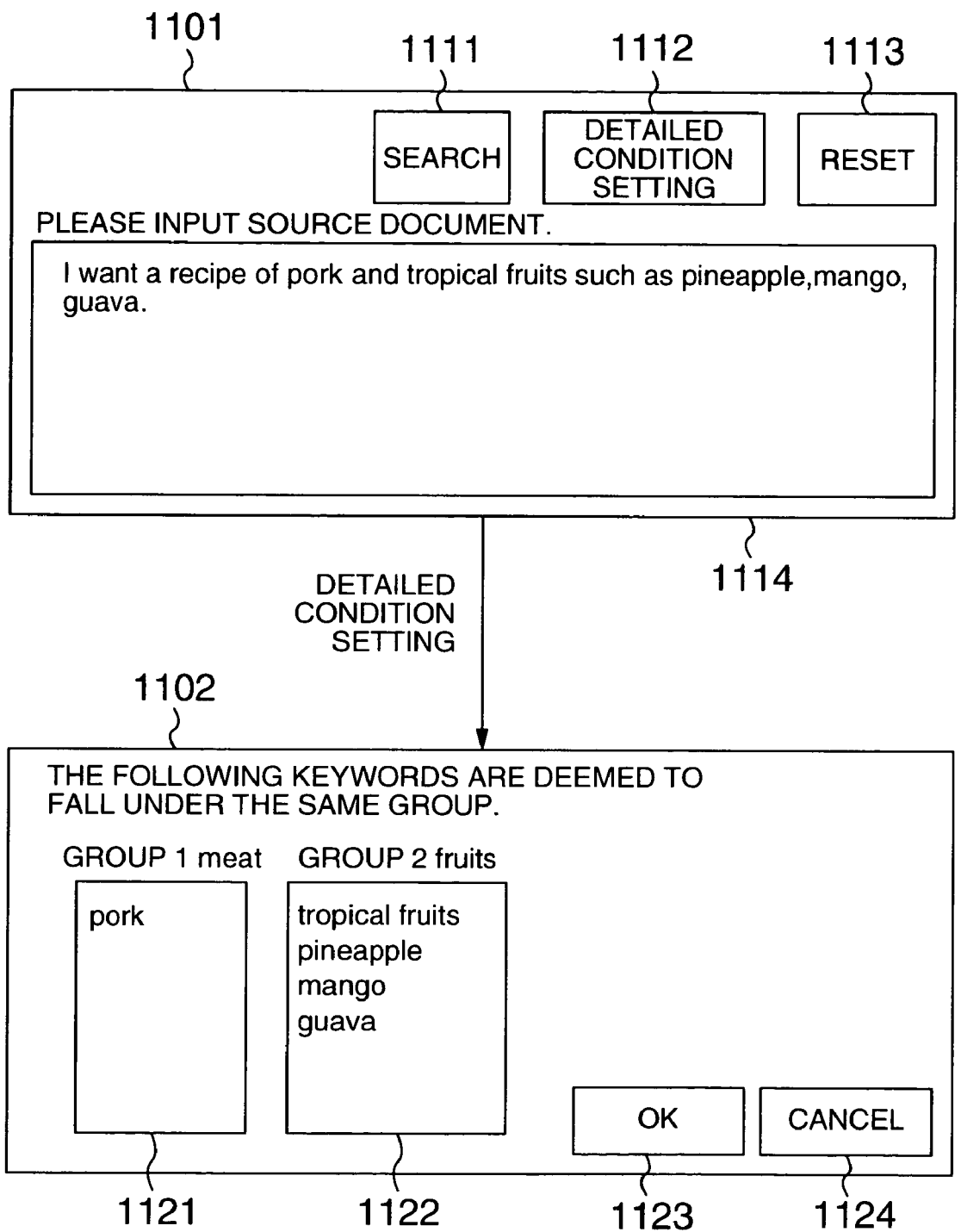
FIG. 11 is a diagram showing an example of a query input view in the second embodiment of the invention.

Referring now to FIG. 11, there is illustrated an example of a query input view in the similar document search system to which the invention is applied.

A source document input view 1101 shown in FIG. 11 has a source document input area-1114, a search execution command transmitting button 1111, a detailed condition setting button 1112 and a reset button 1113 for erasing data inputted to the source document input area 1114.

When a source document is inputted at the source document input area 1114 on source document input view 1101 and the detailed condition setting button 1112 is depressed, the picture shifts to a detailed condition confirmation view 1102.

The detailed condition confirmation view 1102 has areas 1121 and 1122 at which subordinate keywords are displayed according to the keyword attributes determined by the keyword attribute decision step 903 of element-type decision program 801 shown in FIG. 9 and besides, has an OK button 1123 for execution of similar document search under the displayed condition and a cancel button 1124 for stopping execution of search.

In the example shown in this figure, the source document input view 1101 shifts to the detailed condition confirmation view 1102 at the time that the detailed condition setting button 1112 is depressed but alternatively, the shifting may be done at the time that the search execution command transmitting button 1111 is depressed.

Further, in the example shown in this figure, keywords belonging to the same group are displayed at each of the areas 1121 and 1122 on the detailed condition confirmation view 1102 but the searcher may participate in editing the display on the view.

Figure 12:
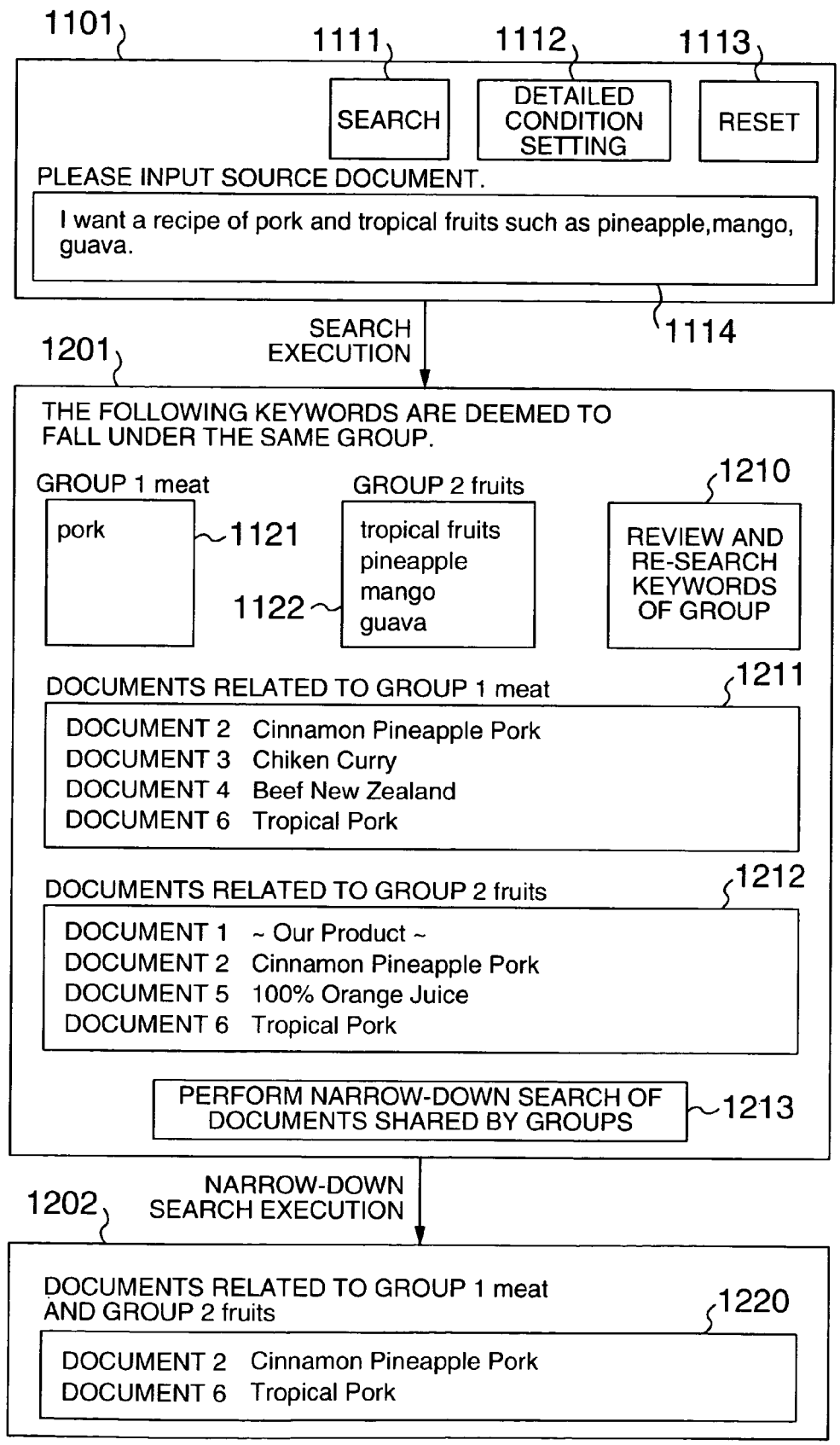
FIG. 12 is a diagram showing an example of a search result display view in the second embodiment of the invention.

Turning now to FIG. 12, an example of a search result display view will be described which is delivered as a result of a search executed by depressing the search execution command transmitting button 1111 on the source document input view 1102 shown in FIG. 11 or by depressing the similar document search execution OK button 1123 on the detailed condition confirmation view 1102.

A search result display view 1201 has areas 1121 and 1122 at which subordinate keyword groups are displayed according to the keyword attributes determined by the keyword attribute decision step 903 of element-type decision program 801 shown in FIG. 9 and besides, has a re-search execution command button 1210 for reviewing the keywords and commanding execution of a re-search as well as areas 1211 and 1212 for displaying search results according to the keyword attributes. In addition, the view 1201 has a narrow-down search button 1213 depressed when the searcher determines that a narrow-down search is necessary.

When this narrow-down button 1213 is depressed, a narrow-down search of a document or documents common to the groups (in the case of FIG. 12, a document or documents related in common to groups 1 and 2) is executed and a result of the narrow-down search is displayed, as search result 1220, on a view 1202.

In the example shown in this figure, the keyword group belonging to the same group is displayed at the areas 1121 or 1122 on the detailed condition confirmation view 1102 but the searcher may participate in editing the display on the view.

Further, in the example shown in the figure, the search results are displayed according to the keyword attributes but the individual documents may be displayed in descending order of similarity assigned to all of the documents or the similarity may be displayed along with group-similarity ratios.

Further, in the search result display areas 1211, 1212 and 1220 shown in the figure, the document number of a registered document is displayed together with the heading of the registered document but alternatively, sites corresponding to the individual keyword attributes used for search may be displayed.

As described above, according to the second embodiment, the searcher need not consider the complicated characteristic vector for the purpose of obtaining highly accurate search results and load imposed on the searcher can be alleviated.

In the keyword attribute decision step 903 in the present embodiment, the element-type dictionary 802 is consulted but any precedently prepared dictionary may not necessarily be used and for example, a decision may be made by using the keyword cooccurrence probability defining the probability that a set of keywords concurrently appear in the same registered document.

As has been described, according to the present invention, a concept expressed by a plurality of keywords can be expressed by one element of a characteristic vector and therefore similarity calculation taking complicated concepts into consideration can be done and a highly accurate concept search can be realized.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A similarity calculation method for calculating similarity among documents in a document search system adapted to search documents registered in advance, comprising:

storing, in a storage as a searching index, each of keywords contained in a previously registered document;

extracting each of keywords contained in a query inputted by a searcher;

deciding an attribute of each of said keywords by referring to an element-type dictionary which provides correspondence relationships between keywords and attributes;

classifying said extracted keywords on an attribute basis in accordance with a result of decision and counting a number of keywords belonging to each of the attributes thus classified to determine a count number of each of the attributes;

comparing said count numbers of attributes thus determined with count numbers of corresponding attributes of said previously registered document;

calculating similarity between said query and said previously registered document on a basis of comparison of said count numbers; and wherein the searching index stores character strings with respect to a plurality of previously registered documents;

wherein at least one keyword of the keywords contained in the query is decided as a first group of the keywords, and at least one different keyword of the keywords is decided as a second group of the keywords;

wherein the deciding, classifying, counting, comparing and calculating operations are performed for the first group of the keywords to determine a first subset of the previously registered documents having similarity to the at least one keyword, and are separately performed for the second group of the keywords to determine a second subset of the previously registered documents having similarity to the at least one different keyword;

the similarity calculation method further comprising:

determining any previously registered documents which are common to both the first and second subsets to narrow-down to documents having similarity to said query.

2. A computer-readable medium having computer-readable code therein, which, when extended by a computer, causes the computer to implement a similarity calculation method for calculating similarity among documents in a document search system adapted to search documents registered in advance, the similarity calculation method comprising:

storing, in a storage as a searching index, each of keywords contained in a previously registered document;

extracting each of keywords contained in a query inputted by a searcher;

deciding an attribute of each of said keywords by referring to an element-type dictionary which provides correspondence relationships between keywords and attributes;

classifying said extracted keywords on an attribute basis in accordance with a result of decision and counting a number of keywords belonging to each of the attributes thus classified to determine a count number of each of the attributes;

comparing said count numbers of attributes thus determined with count numbers of corresponding attributes of said previously registered document;

calculating similarity between said query and said previously registered document on a basis of comparison of said count numbers; and wherein the searching index stores character strings with respect to a plurality of previously registered documents;

wherein at least one keyword of the keywords contained in the query is decided as a first group of the keywords, and at least one different keyword of the keywords is decided as a second group of the keywords;

wherein the deciding, classifying, counting, comparing and calculating operations are performed for the first group of the keywords to determine a first subset of the previously registered documents having similarity to the at least one keyword, and are separately performed for the second group of the keywords to determine a second subset of the previously registered documents having similarity to the at least one different keyword;

the similarity calculation method further comprising:

determining any previously registered documents which are common to both the first and second subsets to narrow-down to documents having similarity to said query.

3. A document search system adapted to search documents registered in advance, comprising:

a processor adapted with software and supportive hardware, for calculating similarity among documents, the processor adapted to effect operations comprising:

storing, in a storage as a searching index, each of keywords contained in a previously registered document;

extracting each of keywords contained in a query inputted by a searcher;

deciding an attribute of each of said keywords by referring to an element-type dictionary which provides correspondence relationships between keywords and attributes;

classifying said extracted keywords on an attribute basis in accordance with a result of decision and counting a number of keywords belonging to each of the attributes thus classified to determine a count number of each of the attributes;

comparing said count numbers of attributes thus determined with count numbers of corresponding attributes of said previously registered document;

calculating similarity between said query and said previously registered document on a basis of comparison of said count numbers; and wherein the searching index stores character strings with respect to a plurality of previously registered documents;

wherein at least one keyword of the keywords contained in the query is decided as a first group of the keywords, and at least one different keyword of the keywords is decided as a second group of the keywords;

wherein the deciding, classifying, counting, comparing and calculating operations are performed for the first group of the keywords to determine a first subset of the previously registered documents having similarity to the at least one keyword, and are separately performed for the second group of the keywords to determine a second subset of the previously registered documents having similarity to the at least one different keyword;

the processor adapted to effect further operations comprising:

determining any previously registered documents which are common to both the first and second subsets to narrow-down to documents having similarity to said query.

4. A similarity calculation method for calculating similarity among documents in a document search system adapted to search documents registered in advance, comprising:

storing, in a storage as a searching index, each of keywords contained in a previously registered document;

extracting each of keywords contained in a query inputted by a searcher;

deciding an attribute of each of said keywords by referring to an element-type dictionary which provides correspondence relationships between keywords and attributes;

classifying said extracted keywords on an attribute basis in accordance with a result of decision and counting a number of keywords belonging to each of the attributes thus classified to determine a count number of each of the attributes;

comparing said count numbers of attributes thus determined with count numbers of corresponding attributes of said previously registered document; and calculating similarity between said query and said previously registered document on a basis of comparison of said count numbers.

5. A computer-readable medium having computer-readable code therein, which, when executed by a computer, causes the computer to implement a similarity calculation method for calculating similarity among documents in a document search system adapted to search documents registered in advance, the similarity calculation method comprising:

storing, in a storage as a searching index, each of keywords contained in a previously registered document;

extracting each of keywords contained in a query inputted by a searcher;

deciding an attribute of each of said keywords by referring to an element-type dictionary which provides correspondence relationships between keywords and attributes;

classifying said extracted keywords on an attribute basis in accordance with a result of decision and counting a number of keywords belonging to each of the attributes thus classified to determine a count number of each of the attributes;

comparing said count numbers of attributes thus determined with count numbers of corresponding attributes of said previously registered document; and calculating similarity between said query and said previously registered document on a basis of comparison of said count numbers.

6. A document search system adapted to search documents registered in advance, comprising:

a processor adapted with software and supportive hardware, for calculating similarity among documents, the processor adapted to effect operations comprising:

storing, in a storage as a searching index, each of keywords contained in a previously registered document;

extracting each of keywords contained in a query inputted by a searcher;

deciding an attribute of each of said keywords by referring to an element-type dictionary which provides correspondence relationships between keywords and attributes;

classifying said extracted keywords on an attribute basis in accordance with a result of decision and counting a number of keywords belonging to each of the attributes thus classified to determine a count number of each of the attributes;

comparing said count numbers of attributes thus determined with count numbers of corresponding attributes of said previously registered document; and calculating similarity between said query and said previously registered document on a basis of comparison of said count numbers.

* * * * *